F. M. OPPERMANN.
APPARATUS FOR THE MANUFACTURE OF SHEET GLASS.
APPLICATION FILED NOV. 27, 1906.
915,879.
Patented Mar. 23, 1909.
5 SHEETS—SHEET 3.
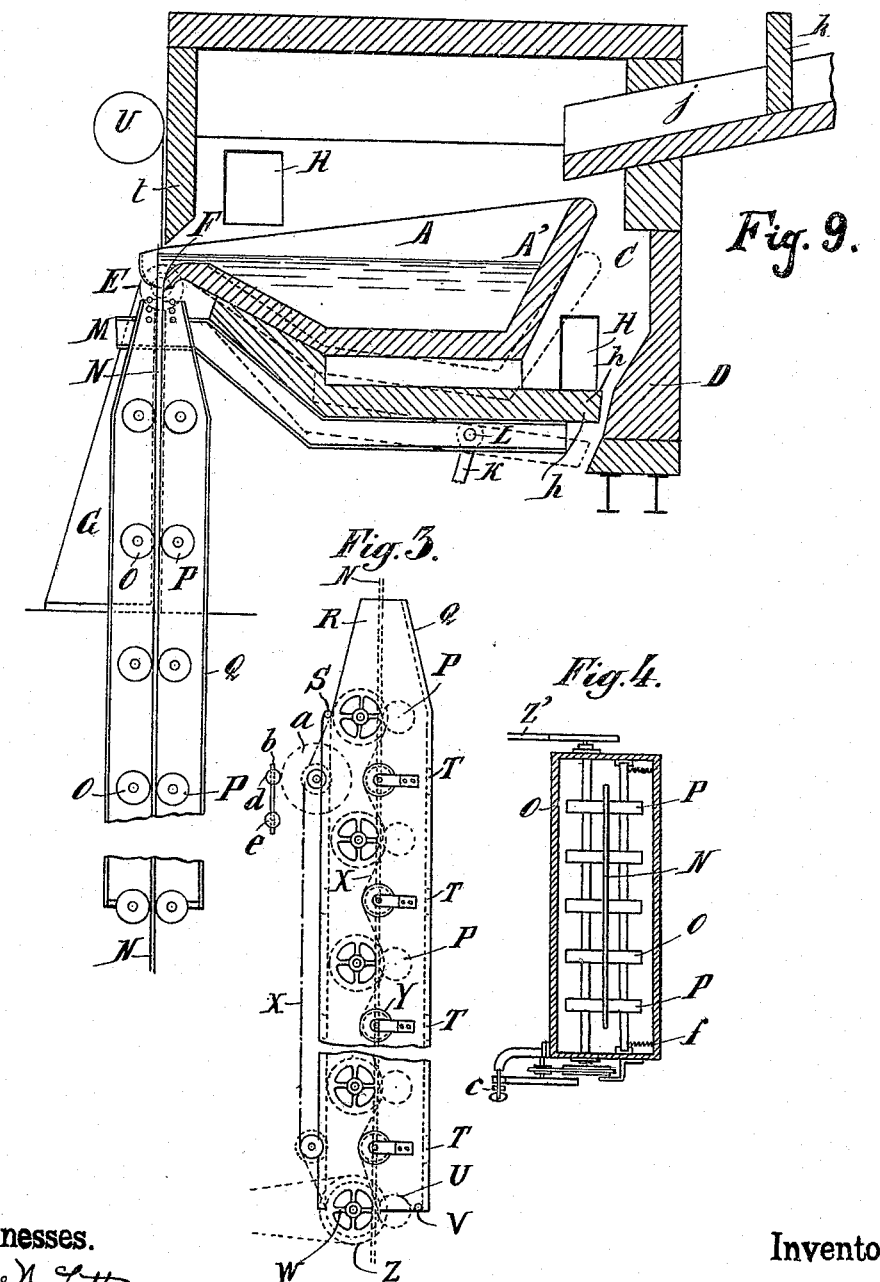

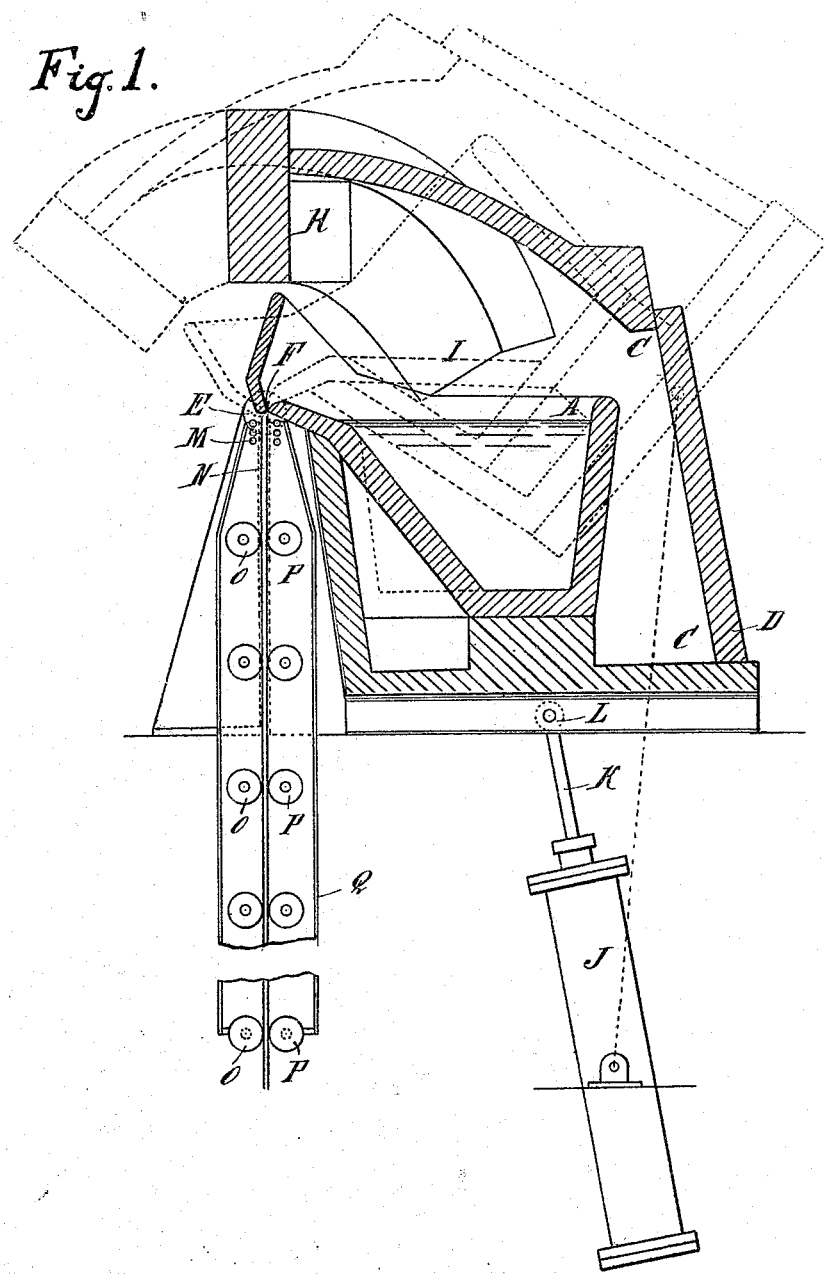

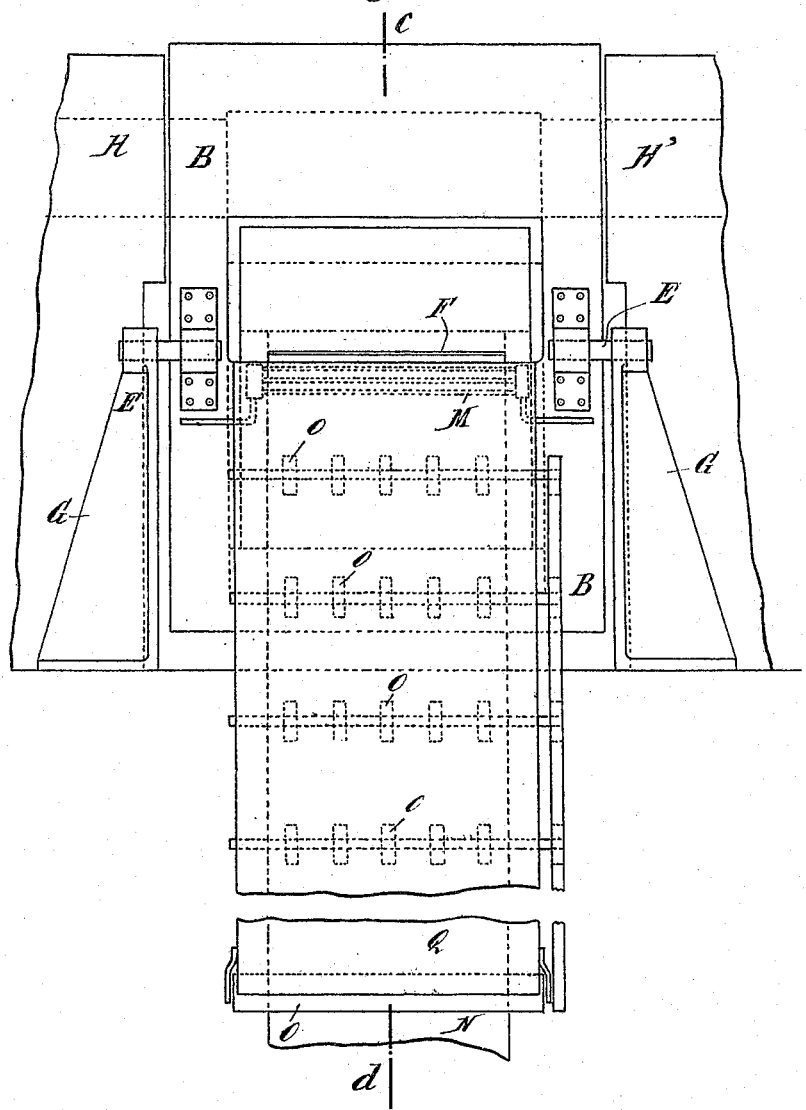

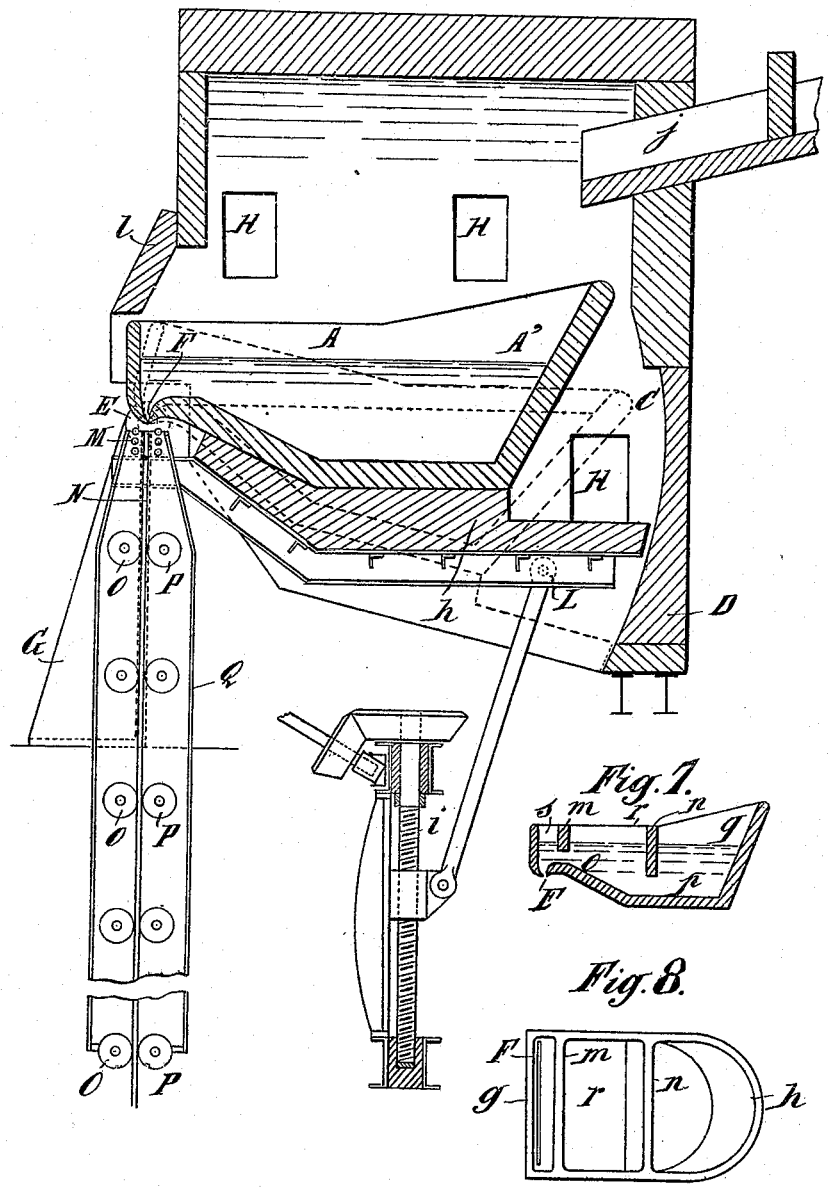

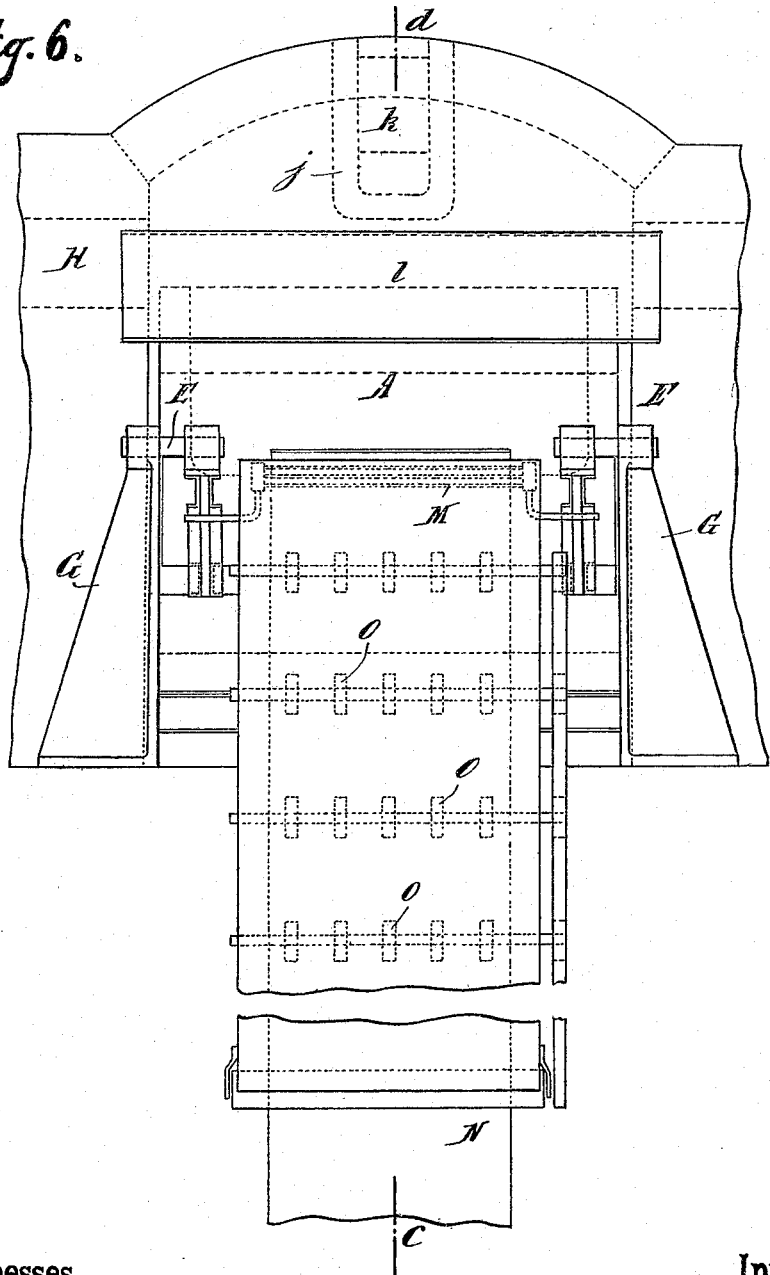

UNITED STATES PATENT OFFICE.

FREDERICK MICHEL OPPERMANN, OF NAMUR, BELGIUM.

APPARATUS FOR THE MANUFACTURE OF SHEET-GLASS.

No. 915,879.　　　　Specification of Letters Patent.　　Patented March 23, 1909.

Application filed November 27, 1906. Serial No. 345,312.

*To all whom it may concern:*

Be it known that I, FREDERICK MICHEL OPPERMANN, a citizen of the United States of America, residing at 66 Chaussir de Watulor, Namur, in the Kingdom of Belgium, have invented certain new and useful Improvements in Apparatus for the Manufacture of Sheet-Glass; and I do hereby declare the following to be a full, clear, and exact description of the invention, such as will enable others skilled in the art to which it appertains to make and use the same, reference being had to the accompanying drawings, and to letters of reference marked therein, which form a part of this specification.

In this process the plate glass is manufactured by flowing.

The principle of the invention is as follows:—The crucible or melting pot which contains the hot and liquid glass has a hole in one of its sides, which lies below the rim of the pot and higher than the level of the glass inside the pot. If now the pot is tilted toward this opening, the glass will flow through it, according to the shape of the pot. The side of the pot which has the opening can be made flat, so that the opening appears as a straight slot in same. The glass when running out of the slot will have the shape of a sheet. If the glass is cooled down as it leaves the slot the sheet becomes a strip or plate. Should the glass have a descending flow it will be necessary to regulate the descent and support the strip of glass as it may become detached from the sheet as it gets set and hard.

If the outflow of the glass is in an upward direction the set or hardened portion must be drawn upward in the same way as the solidification takes place. In this way plate glass of an unlimited length may be manufactured, the width and thickness of which plate is arranged according to the size of the slot and partly to the temperature of the glass and the height of the level of the glass above the slot.

The axles on which the pot turns are preferably placed at the same height as the slot, although same may be placed elsewhere. The pot is placed inside a small pouring oven. The whole of this oven can be made to turn around its horizontal axles, or if desired only the bottom on which the pot rests is allowed to follow the movement the other parts of the oven remaining stationary. The cooling down of the glass as it comes out of the slot is done by means of metal tubes, in which circulates a liquid of a lower temperature than that of the plate glass.

The strip of glass is held by friction wheels, which wheels regulate the movement of the glass as it comes away from the slot. These wheels are worked through a motor and as well as the sheet of glass are closed up inside a case, so as to prevent a too rapid cooling of the glass. As the strip of glass comes out of the case, pieces of any required length may be cut off by means of a diamond, cutting wheel or the like. With regard to the feeding of the pouring pot, several methods may be adopted as after the pot is emptied it can be exchanged for a full one, in which case the process of manufacturing is interrupted while the pots are changed. This system answers well when small quantities of the same kind of glass but of different shades are required. The pot can also be left inside the oven and be fed continuously by means of a guttering which conveys the melted glass. This guttering may be attached to a furnace containing a basin of melting glass, which supplies the pouring pot with liquid while in the guttering there is fixed a regulator that may be raised or lowered so as to regulate the flow of glass to the pouring pot or even stop the flow altogether. The feed gutter is placed in such a way that the glass dropping from it falls on to the inner side of the pot not covered by the glass, so that the falling glass will not interfere with the glass already in the pot, but slides into same.

The regulating of the friction pulleys which hold the strip of glass may be done by any known device such as a pendulum, fly wings and the like in some cases the weight of the glass is sufficient to work the regulator. The first pair of friction pulleys with which the sheet of glass comes into contact must be far enough from the slot to allow the glass to sufficiently cool down before reaching them, otherwise the surface of the glass will become marked or lose some of its brightness. The pulleys or at least their surfaces which come into contact with the glass are made of an elastic material such as paper, tissues or the like having natural fireproof properties or being fire proofed with some solution in the usual way.

The method of manufacture is as follows— The pot is inclined backward so that the slot is free and at the top or bottom of this slot a metal gauze, a portion of sheet iron or an asbestos sheet is placed which is held at one side by the friction pulleys, and at the other side it is attached to the slot through which the glass passes, such arrangement serves as a temporary support to the strip of glass while it is being made. The pot is now allowed to turn on its axles, so that the glass enters the slot coming into touch with the metal gauze sheet iron or asbestos support and meets with the friction wheels. Should armored glass be required, the metal gauze is brought continuously from the top into the slot so that it is always surrounded by the following glass.

When the operation is in progress and the flow of the glass in the gutter properly regulated, and the pot tilted at the correct angle for the pouring of the glass, the tilting of the pot may be discontinued and be left stationary until a further tilting of the pot is found necessary.

In order that my invention may be clearly understood and more easily carried into practice, I have appended hereunto five sheets of drawings upon which I have illustrated the nature of my said improvements.

Figure 1 is a vertical section according to line C. D. in Fig. 2. Fig. 2 is an elevation. Fig. 3 is a side view of the cooling case. Fig. 4 is a horizontal section of the cooling case which contains the friction pulleys O and P that support the strip of glass N. Figs. 5, 6, 7 and 8 represent a continual installation. Fig. 5 is a vertical section according to line c—d. Fig. 6 is a front view. Fig. 7 is a vertical section as per line g—h in Fig. 8. Fig. 8 is a simplified plan of the pouring pot. Fig. 9 is a vertical section of an apparatus for making of armored glass by this system.

The apparatus shown is for the intermediate process, that is the pot is placed full of glass into the oven and taken out when empty to be replaced by another full pot.

A is the pouring pot in the movable pouring oven.

B the pouring oven Fig. 2.

C is a door opening, closed by tile D.

The oven turns on its axles E the position of which corresponds with that of the slot F. The axles are rested in supports G. The oven is heated by flames which come in and go out respectively by means of canals H and H' which establish the heating communication to a fixed regenerating oven. The structure herein described acts as the pouring oven as follows. The notches I made in the side walls of the pouring oven, allow the flames to enter into same in any position of the oven. The extreme pouring position is indicated by dotted lines. The rotary movement of the pouring oven is in this instance effected by a hydraulic cylinder J with piston and rod K, which are joined to the bottom of the pouring oven by the pivot L that is attached to the case of the oven.

M is the metal tube containing the cooling liquid.

N represents a sheet of glass manufactured.

O and P are the friction pulleys which hold the strip of glass by pressure.

Q is the case which contains the strip of glass while it is descending and where the latter is allowed to cool gradually. The case Q is made of two metal plates between which is placed a non conductive material.

R is a door turning on hinges, which enables the operator to watch the process.

T are doors for ventilation as well as for observation.

The last friction pulleys where the sheet of glass comes out of the case, are solid and fit closely into the case so as to prevent outside air entering the case. The clippers U which are also made to fit tightly work on hinges V.

At each end of the shaft which carries the pulley O a cog wheel W is provided over which passes an endless chain X, the return of which is guided by two cog wheels.

Y are pulleys which work horizontally and which prevent the chain slipping off the cogs by stretching same.

Z is a pulley fixed on one or the other of the shafts and transmitting or receiving their movements through the endless chain.

Z' is a belt driven from a motor.

For regulating, a clockwork mechanism could also be used, whereby the gear $a$ would be fixed to one or the other shaft for transmitting the movement through the endless chain, $b$ is a cogwheel gearing which works on the shaft that carries a ratchet wheel $c$, an anchor $d$, and a pendulum $e$.

$f$ are springs to push the pulleys P firmly against the strip of glass N regulating and supporting its descent.

The case Q is supported either by brickwork, pillars, beams or in some other suitable way.

The Figs. 5, 6, 7 and 8 represent a continual installation. A' indicates the level of the glass inside the pouring pot A when same is ready for use. The position marked by a dotted line shows the movable bottom and the pot when stopped in such case becomes the level of the glass which cannot then flow out. C is the opening through which the pot is put in, D is the tile to close the opening, $h$ is the movable bottom of the pouring pot by which it is supported when turning around the axle E, F is the slot for the glass to flow out. G are supports for the axles, H' are openings for the flame to heat the oven, $i$ is a screw for turning the pot around its axles. K is the rod transmitting the movement on the pivot L. The screw is set in motion either by hand gear or motor crank. M, N, O, P and Q apply in the same way as in Figs. 1 and 2, $j$ is the gutter for the liquid glass and $k$ is the regulator to regulate or stop the flow of glass. $l$ is a movable tile of metallic gauze, sheet iron or asbestos, which serves as a support to the glass at the beginning of the operation of flowing. F is the pouring slot, m and n are partitions arranged inside the pot to retain any impurities which float on the surface of the glass. By means of these partitions which do not quite reach to the bottom of the pot, the pure glass can only pass through the canals o and p, while with such pots it is impossible to use vitrifying compositions, for which purpose the compartment q is arranged, r is a compartment for refining, and s a compartment for flowing glass to the slot F.

In the Fig. 9, t is the metal trellis rolled around the drum u, from which it drops into the glass and comes out through the pouring slot in the center of the sheet of glass. The movable bottom h is provided with passages to allow if necessary the flame to heat the bottom of the pot, the flame or other source of heat to keep the glass sufficiently hot for a proper flowing, could be arranged by placing a canal in the front part of the pot next to the pouring slots.

I do not confine myself to the detailed shape or arrangement of mechanism herein described as same may be slightly altered so as to suit the various circumstances.

Having now particularly described and ascertained the nature of my said invention and in what manner the same is to be performed, I declare that what I claim is:—

1. The combination with a tilting receptacle for molten glass, trunnions on which the receptacle is mounted, said receptacle having a sheet-forming slot in one of its walls substantially in alinement with the trunnions, and means to tilt the receptacle to pour through the slot from beneath the surface of its molten contents.

2. The combination with a furnace, of a receptacle therein having a pouring slot at its front, means to mount the receptacle to rotate about the slot, means to tilt the receptacle in the furnace to maintain a hydraulic head of molten glass over the slot, means to continuously supply molten glass to the back of the receptacle, means to set the glass as it issues from the slot, and means to support and move the glass sheet from the slot in accordance with the pouring to prevent the drawing of the glass.

3. The combination with a furnace having a pivoted bottom, of a pot in the furnace having a sheet forming slot in one of its walls substantially in alinement with the axis of rotation of the bottom, and below a head maintained at said slot and means to rotate the bottom about its pivots.

4. The combination with a furnace; of a pot having its forward end projecting from the furnace, said forward end containing a sheet forming slot located below the level of the molten glass in the pot and in alinement with the plane of movement of the sheet of glass being made, means to mount the pot to rotate substantially about the slot as an axis and means to rotate the pot during the formation of the sheet.

5. In the manufacture of sheet glass, the combination with sheet supporting mechanism, of a pot having a downwardly directed glass supply slot outside of the furnace and means to rotate the pot about the axis of the slot and over the supporting mechanism.

6. The combination with a glass pot having an incline extending from substantially the bottom of the pot above the level of the glass at all times in the pot and means to supply molten glass onto the incline and above the level of the glass in the pot, whereby the incoming glass will slide down the incline from above the level of the glass in the pot into the body of molten glass in the pot.

7. In the manufacture of sheet glass, a receptacle for molten glass having a glass supply slot in one of its walls and below the liquid level in the receptacle means to rotate the receptacle about the axis of the slot, and a heating chamber for the receptacle and in which said receptacle is moved.

8. In a sheet glass making mechanism, the combination with means for vertically supporting a sheet of glass; of a receptacle having a glass supply slot therein and means to rotate the receptacle with respect to the slot to maintain a constant delivery to the supporting mechanism.

9. In sheet glass making mechanism, a furnace, a movable bottom for said furnace, a receptacle on the bottom having a pouring slot below the level of the molten glass in the receptacle when it is in pouring position, that part of the receptacle containing the slot forming the front of the furnace, and means to tilt the furnace bottom about the slot as an axis of rotation.

In testimony that I claim the foregoing as my invention, I have signed my name in presence of two subscribing witnesses.

FREDERICK MICHEL OPPERMANN.

Witnesses:
GEORGE VANDER HAUGHEN,
EUGÉNE VANDENPLAZ.